(12) United States Patent
Mattfolk et al.

(10) Patent No.: US 12,302,482 B2
(45) Date of Patent: May 13, 2025

(54) INTERRUPTING CIRCUIT FOR A RADIO FREQUENCY GENERATOR

(71) Applicant: WHIRLPOOL CORPORATION, Benton Harbor, MI (US)

(72) Inventors: Henrik Mattfolk, Benton Harbor, MI (US); Davide Guatta, Brescia (IT)

(73) Assignee: Whirlpool Corporation, Benton Harbor, MI (US)

( * ) Notice: Subject to any disclaimer, the term of this patent is extended or adjusted under 35 U.S.C. 154(b) by 1081 days.

(21) Appl. No.: 17/301,170

(22) Filed: Mar. 29, 2021

(65) Prior Publication Data

US 2021/0219391 A1   Jul. 15, 2021

Related U.S. Application Data

(62) Division of application No. 15/107,588, filed as application No. PCT/US2013/077431 on Dec. 23, 2013, now Pat. No. 10,993,293.

(51) Int. Cl.
| | |
|---|---|
| *H05B 6/68* | (2006.01) |
| *H05B 6/64* | (2006.01) |
| *H05B 6/66* | (2006.01) |
| *H05B 6/72* | (2006.01) |
| *H05B 6/76* | (2006.01) |

(52) U.S. Cl.
CPC .......... *H05B 6/681* (2013.01); *H05B 6/6417* (2013.01); *H05B 6/666* (2013.01); *H05B 6/686* (2013.01); *H05B 6/72* (2013.01); *H05B 6/76* (2013.01); *H05B 2206/044* (2013.01); *H05B 2206/046* (2013.01); *Y02B 40/00* (2013.01)

(58) Field of Classification Search
CPC ........ H05B 2206/044; H05B 2206/046; H05B 6/6417; H05B 6/666; H05B 6/681; H05B 6/686; H05B 6/72; H05B 6/76; Y02B 40/00; Y02E 30/30
USPC ....................................................... 219/716
See application file for complete search history.

(56) References Cited

U.S. PATENT DOCUMENTS

| | | |
|---|---|---|
| 2,742,612 A | 4/1956 | Cohn |
| 2,981,904 A | 4/1961 | Ajioka et al. |
| 3,265,995 A | 8/1966 | Hamasaki |
| 3,430,023 A | 2/1969 | Tingley |
| 3,737,812 A | 6/1973 | Gaudio et al. |
| 3,784,781 A | 1/1974 | Foerstner et al. |
| 4,088,861 A | 5/1978 | Zwillinger |

(Continued)

FOREIGN PATENT DOCUMENTS

| | | |
|---|---|---|
| CN | 1523293 A | 8/2004 |
| CN | 101118425 A | 2/2008 |

(Continued)

*Primary Examiner* — Steven W Crabb
*Assistant Examiner* — Ket D Dang
(74) *Attorney, Agent, or Firm* — Price Heneveld LLP

(57) ABSTRACT

An interrupting circuit (44) is configured to monitor for and detect a fault in a device (10) for generating a field of electromagnetic radiation (e-field) (34) from a radio frequency (RF) generator (24) configured to convert low voltage direct current (DC) into the e-field (34) for application to an article in the e-field (34). If a fault is detected, the interrupting circuit (44) interrupts low voltage DC between an energy reserve (46, 48) and the RF generator (24) within a predetermined time less than the time to dissipate energy stored in the energy reserve (46, 48).

12 Claims, 4 Drawing Sheets

(56) References Cited

U.S. PATENT DOCUMENTS

| | | | |
|---|---|---|---|
| 4,139,828 A | 2/1979 | Commault et al. | |
| 4,143,646 A | 3/1979 | Sampsel | |
| 4,196,332 A | 4/1980 | MacKay et al. | |
| 4,277,671 A | 7/1981 | Mori et al. | |
| 4,354,562 A | 10/1982 | Newman | |
| 4,374,319 A | 2/1983 | Guibert | |
| 4,415,887 A | 11/1983 | Kawase | |
| 4,463,324 A | 7/1984 | Rolfs | |
| 4,506,127 A * | 3/1985 | Satoh | H05B 6/6411 219/718 |
| 4,628,351 A | 12/1986 | Heo | |
| 4,703,151 A | 10/1987 | Sakamoto | |
| 4,743,728 A | 5/1988 | Nagafusa et al. | |
| 4,786,774 A | 11/1988 | Kaminaka | |
| 4,870,238 A | 9/1989 | Hodgetts et al. | |
| 4,886,046 A | 12/1989 | Welch | |
| 4,937,413 A | 6/1990 | Spruytenburg et al. | |
| 5,075,525 A | 12/1991 | Jung | |
| 5,256,859 A | 10/1993 | Nanos et al. | |
| 5,369,254 A | 11/1994 | Kwon | |
| 5,483,045 A | 1/1996 | Gerling | |
| 5,619,983 A | 4/1997 | Smith | |
| 5,831,253 A | 11/1998 | Han et al. | |
| 5,878,910 A | 3/1999 | Gibernau et al. | |
| 5,919,389 A | 7/1999 | Uehashi et al. | |
| 5,973,305 A | 10/1999 | Kim et al. | |
| 5,981,929 A | 11/1999 | Maeda et al. | |
| 6,018,158 A | 1/2000 | Kang | |
| 6,054,696 A | 4/2000 | Lewis et al. | |
| 6,057,535 A | 5/2000 | Derobert et al. | |
| 6,097,019 A | 8/2000 | Lewis et al. | |
| 6,268,593 B1 | 7/2001 | Sakai | |
| 6,359,270 B1 | 3/2002 | Bridson | |
| 6,429,370 B1 | 8/2002 | Norte et al. | |
| 6,507,732 B1 * | 1/2003 | Dajer | H04B 1/04 375/345 |
| 6,557,756 B1 | 5/2003 | Smith | |
| 6,559,882 B1 | 5/2003 | Kerchner | |
| 6,853,399 B1 | 2/2005 | Gilman et al. | |
| 7,058,826 B2 * | 6/2006 | Fung | G06F 1/3221 709/200 |
| 7,193,195 B2 | 3/2007 | Lundstrom et al. | |
| 7,361,871 B2 | 4/2008 | Cho et al. | |
| 7,476,828 B2 | 1/2009 | Genua | |
| 7,482,562 B2 | 1/2009 | Song et al. | |
| 7,533,283 B2 * | 5/2009 | Fung | G06F 1/3203 702/132 |
| 7,751,783 B2 * | 7/2010 | Ouzillou | H03F 1/52 455/127.1 |
| 7,926,313 B2 | 4/2011 | Schenkl et al. | |
| 8,074,637 B2 | 12/2011 | Yamauchi | |
| 8,389,916 B2 | 3/2013 | Ben-Shmuel et al. | |
| 8,455,803 B2 | 6/2013 | Danzer et al. | |
| 8,530,807 B2 | 9/2013 | Niklasson et al. | |
| 8,745,203 B2 | 6/2014 | McCoy | |
| 8,803,051 B2 | 8/2014 | Lee et al. | |
| 9,131,543 B2 | 9/2015 | Ben-Shmuel et al. | |
| 9,132,408 B2 | 9/2015 | Einziger et al. | |
| 9,179,506 B2 | 11/2015 | Sim et al. | |
| 9,215,756 B2 | 12/2015 | Bilchinsky et al. | |
| 9,374,852 B2 | 6/2016 | Bilchinsky et al. | |
| 9,492,686 B2 | 11/2016 | Da Silva | |
| 9,560,699 B2 | 1/2017 | Zhylkov et al. | |
| 9,585,203 B2 | 2/2017 | Sadahira et al. | |
| 9,610,038 B2 | 4/2017 | Branch et al. | |
| 2005/0134469 A1 | 6/2005 | Odorcic et al. | |
| 2006/0289526 A1 | 12/2006 | Takizaki et al. | |
| 2009/0134155 A1 | 5/2009 | Kim et al. | |
| 2009/0160417 A1 | 6/2009 | Klimczak et al. | |
| 2010/0092625 A1 * | 4/2010 | Finch | H02J 3/14 99/325 |
| 2010/0176123 A1 * | 7/2010 | Mihara | H05B 6/705 219/746 |
| 2010/0181307 A1 | 7/2010 | Richardson | |
| 2011/0031236 A1 | 2/2011 | Ben-Shmuel et al. | |
| 2011/0108548 A1 * | 5/2011 | Nobue | H05B 6/6494 219/702 |
| 2011/0168699 A1 | 7/2011 | Domori et al. | |
| 2011/0290790 A1 | 12/2011 | Sim et al. | |
| 2012/0067872 A1 | 3/2012 | Libman et al. | |
| 2012/0103972 A1 | 5/2012 | Okajima | |
| 2012/0152939 A1 | 6/2012 | Nobue et al. | |
| 2013/0048881 A1 | 2/2013 | Einziger et al. | |
| 2013/0142923 A1 | 6/2013 | Torres et al. | |
| 2013/0156906 A1 | 6/2013 | Raghavan et al. | |
| 2013/0186887 A1 | 7/2013 | Hallgren et al. | |
| 2013/0200066 A1 | 8/2013 | Gelbart et al. | |
| 2013/0277353 A1 | 10/2013 | Joseph et al. | |
| 2014/0168830 A1 | 6/2014 | Vangool et al. | |
| 2014/0277100 A1 | 9/2014 | Kang | |
| 2015/0034632 A1 | 2/2015 | Brill et al. | |
| 2015/0136758 A1 | 5/2015 | Yoshino et al. | |
| 2015/0156827 A1 | 6/2015 | Ibragimov et al. | |
| 2015/0173128 A1 | 6/2015 | Hosokawa et al. | |
| 2015/0289324 A1 | 10/2015 | Rober et al. | |
| 2015/0305095 A1 | 10/2015 | Huang et al. | |
| 2015/0334788 A1 | 11/2015 | Hofmann et al. | |
| 2015/0373789 A1 | 12/2015 | Meusburger et al. | |
| 2016/0029442 A1 | 1/2016 | Houbloss | |
| 2016/0088690 A1 | 3/2016 | Kubo et al. | |
| 2016/0119982 A1 | 4/2016 | Kang et al. | |
| 2016/0219656 A1 | 7/2016 | Hunter, Jr. | |
| 2016/0353528 A1 | 12/2016 | Bilchinsky et al. | |
| 2016/0353529 A1 | 12/2016 | Omori et al. | |
| 2017/0099988 A1 | 4/2017 | Matloubian et al. | |
| 2017/0105572 A1 | 4/2017 | Matloubian et al. | |

FOREIGN PATENT DOCUMENTS

| | | |
|---|---|---|
| CN | 201081287 Y | 7/2008 |
| CN | 102620324 A | 8/2012 |
| CN | 103156532 A | 6/2013 |
| CN | 203025135 U | 6/2013 |
| CN | 105042654 A | 11/2015 |
| CN | 204987134 U | 1/2016 |
| CN | 106103555 A | 11/2016 |
| EP | 493623 A1 | 7/1992 |
| EP | 1193584 A1 | 4/2002 |
| EP | 1424874 A2 | 6/2004 |
| EP | 1426692 A2 | 6/2004 |
| EP | 1795814 A2 | 6/2007 |
| EP | 2031938 A1 | 3/2009 |
| EP | 2220913 B1 | 5/2011 |
| EP | 2405711 A2 | 1/2012 |
| EP | 2618634 A1 | 7/2013 |
| EP | 2775794 A1 | 9/2014 |
| FR | 2976651 A1 | 12/2012 |
| GB | 639470 A | 6/1950 |
| GB | 2367196 A | 3/2002 |
| JP | 855155120 A | 12/1980 |
| JP | 57194296 U | 12/1982 |
| JP | 59226497 A | 12/1984 |
| JP | 5-10527 A | 1/1993 |
| JP | 6-147492 A | 5/1994 |
| JP | 10160167 A | 6/1998 |
| JP | 2000304593 A | 11/2000 |
| JP | 2008108491 A | 5/2008 |
| JP | 2011146143 A | 7/2011 |
| JP | 2013073710 A | 4/2013 |
| KR | 1020050002121 | 6/2003 |
| KR | 101359460 B1 | 2/2014 |
| KR | 20160093858 A | 8/2016 |
| RU | 2122338 C1 | 11/1998 |
| RU | 2215380 C2 | 10/2003 |
| RU | 2003111214 A | 11/2004 |
| RU | 2008115817 A | 10/2009 |
| RU | 2008137844 A | 3/2010 |
| WO | 03077601 A1 | 9/2003 |
| WO | 2008018466 A1 | 2/2008 |
| WO | 2008102360 A2 | 8/2008 |
| WO | 2009039521 A1 | 3/2009 |
| WO | 2011138680 A2 | 11/2011 |
| WO | 2012001523 A2 | 1/2012 |

(56) References Cited

FOREIGN PATENT DOCUMENTS

| | | |
|---|---|---|
| WO | 2012162072 A1 | 11/2012 |
| WO | 2011039961 A1 | 2/2013 |
| WO | 2015024177 A1 | 2/2015 |
| WO | 2016128088 A1 | 8/2016 |

* cited by examiner

INTERRUPTING CIRCUIT FOR A RADIO FREQUENCY GENERATOR

CROSS-REFERENCE TO RELATED APPLICATION

This application is a divisional of U.S. patent application Ser. No. 15/107,588 filed Jun. 23, 2016, entitled "INTERRUPTING CIRCUIT FOR A RADIO FREQUENCY GENERATOR," the entire disclosure of which is hereby incorporated by reference herein.

BACKGROUND

A radio frequency (RF) amplifier, or RF generator, is capable of generating a field of electromagnetic radiation (e-field) in the radio frequency spectrum from a power source. An energized RF generator may be configured to generate an e-field that may interact with external objects in a desirable or predictable manner. Typically, an RF generator is further coupled with an RF antenna or applicator in order to apply or direct the e-field as needed to interact with the external objects. For example, a microwave oven typically utilizes an AC power input provided to an RF generator to generate an e-field to heat or cook food items.

SUMMARY

The invention relates to a device for generating a field of electromagnetic radiation (e-field) from a radio frequency (RF) generator configured to convert low voltage direct current into the e-field for application to an article in the e-field. The device includes a generator power supply connected between a power source and the RF generator. The generator power supply has one or more energy reserves and one or more power conversion circuits to convert power to low voltage DC for the RF generator. One or more interrupting circuits are configured to monitor for and detect a fault in the device. If a fault is detected, an interrupting circuit interrupts the low voltage DC between the energy reserve and the RF generator within a predetermined time less than the time to dissipate energy stored in the energy reserve.

DETAILED DESCRIPTION

The invention may be implemented in any environment using a radio frequency (RF) generator or amplifier capable of generating a field of electromagnetic radiation (e-field) in the radio frequency spectrum regardless of the application of the e-field and regardless of the frequency or frequency range of the e-field. For purposes of this description, any e-field generating device, for example, a microwave or infrared signal generator, will be generally referred to as an RF generator, or similar language, and any e-field applying device, such as an antenna or anode/cathode coupling or pair, will be generally referred to as an RF applicator. These descriptions are meant to make clear that one or more frequencies or frequency ranges of e-field may be included in embodiments of the invention. While this description is primarily directed toward an RF oven providing an e-field capable of heating and/or cooking food (collectively, "cooking"), it is also applicable to alternative uses of e-field generation, for example, for drying fabrics.

Figure 1:
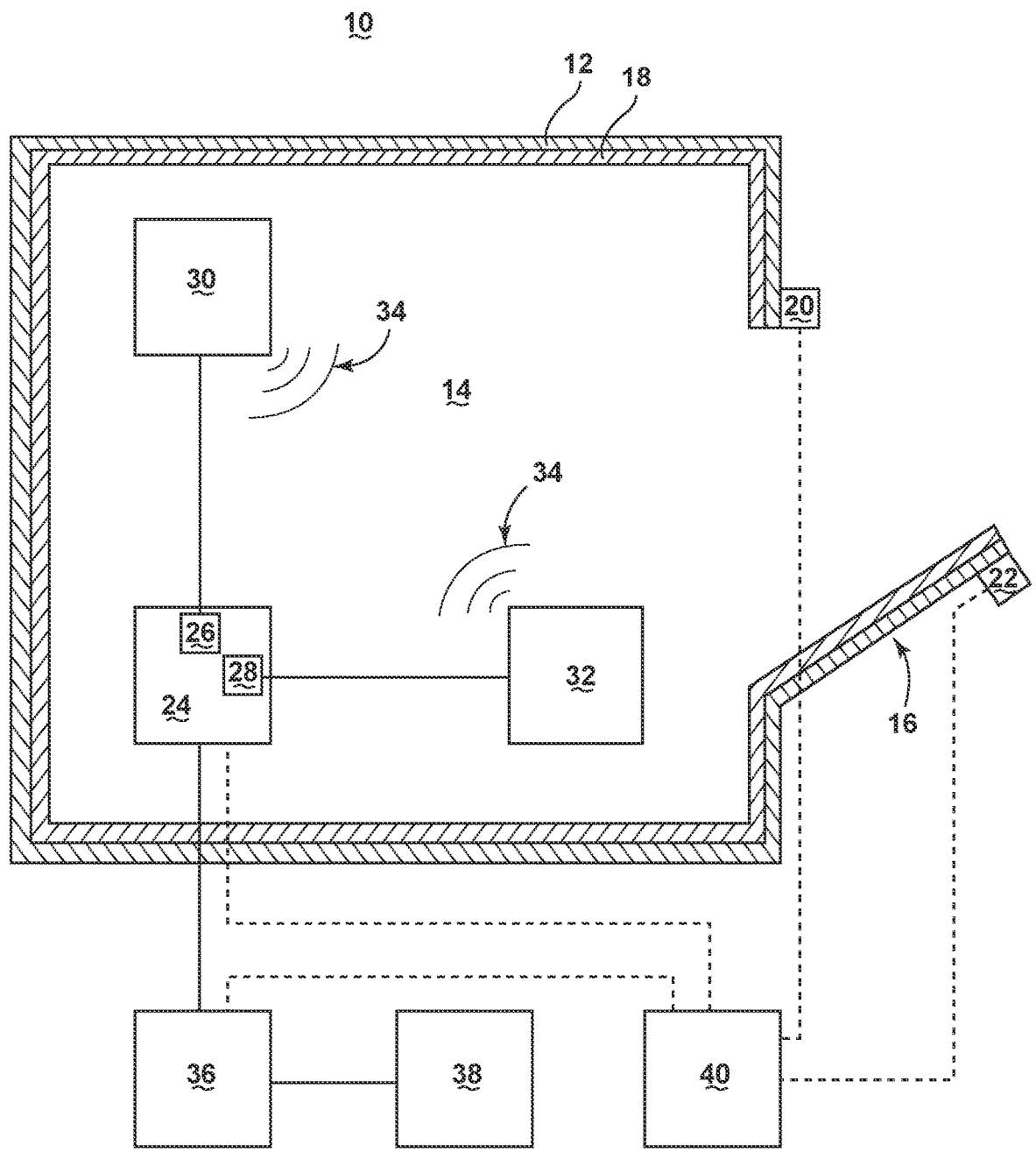
FIG. 1 is a schematic view of an RF oven in accordance with one embodiment of the invention.

FIG. 1 schematically illustrates an RF device 10 in the form of an oven comprising a cabinet 12 defining a cavity 14 for electromagnetically heating and/or cooking food, or foodstuff, in the cavity 14. The oven 10 is shown further comprising a door 16 moveably mounted to the cabinet 12, an RF shielding layer, for example, wire mesh 18, removably or fixedly attached to the cabinet 12 and door 16, and at least one door interlock switch, illustrated as a first door switch 20 and a second door switch 22, each switch 20, 22 capable of independently providing a signal indicative of the state of the door 16.

The oven 10 may further include an RF generator 24, for example, a microwave generator, having at least one RF amplifier, shown as a first solid state RF amplifier 26 and a second solid state RF amplifier 28. The oven 10 further includes at least one RF applicator, illustrated as a first RF applicator 30 and a second RF applicator 32, each applicator 30, 32 configured to apply an e-field 34 to the cavity 14. The oven 10 also has a generator power supply 36 such as a microwave generator power supply, a power source 38, for example, mains power, and a controller 40. While the cavity 14 is illustrated including the RF generator 24 and the first and second RF applicators 30, 32 located in opposing corners of the cavity 14, embodiments of the invention contemplate alternative placements of the components 24, 30, 32, including a configuration wherein the RF generator 24 is located outside of the cavity 14. Furthermore, while the generator power supply 36, power source 38, controller 40, and each of the door switches 20, 22 are shown outside of the cabinet 12, they are collectively envisioned to be included as components of the oven 10, and various placements of the aforementioned components 20, 22, 36, 38, 40 are contemplated, which may include placement within the cavity 14, cabinet 12, and/or wire mesh 18, or in the instances of the door switches 20, 22, any placement such that the switches 20, 22 are capable of determining the state of the door 16.

As shown, the first RF amplifier 26 may be electrically coupled with the first RF applicator 30 and the second RF amplifier 28 may be electrically coupled with the second RF applicator 32. The RF generator 24 may also be electrically coupled with the generator power supply 36, which may further be electrically coupled to the power source 38. The controller 40 is shown communicatively coupled (illustrated as dotted lines) to each door switch 20, 22 and each RF applicator 30, 32, and providing communication signals to each of the RF generator 24 and generator power supply 36.

The door 16 provides movement between an opened state and a closed state, or condition, to selectively provide access to the cavity 14, for instance, to allow for inserting food items to be cooked or for removing food items previously cooked. When closed, the door 16 and corresponding wire mesh 18 are configured to align with the cabinet 12 to effectively prevent access to, and/or effectively seal, the cavity 14. The cavity 14 is further sealed due to the configuration of the wire mesh 18, which operates to prevent any e-field leakage into, or out of, the cabinet 12 and cavity 14.

The RF generator 24 is configured to receive a power input and may generate one, two, three, four, or any number of RF signals, as needed by the particular oven application. The RF generator 24 is further configured to deliver each respective signal to a corresponding RF amplifier 26, 28. In the example illustrated, the RF generator 24 is capable of generating two RF signals, which are delivered to corresponding first and second RF amplifiers 26, 28, each of which amplifies an independent RF signal. It is envisioned that each RF signal may correspond to at least one RF amplifier 26, 28. Thus, non-limiting examples of embodiments of the invention are envisioned wherein one RF signal may correspond to one RF amplifier 26, two RF signals may correspond to two respective RF amplifiers 26, 28, three RF signals may correspond to three respective RF amplifiers, or four RF signals may correspond to four respective RF amplifiers, etc. Additionally, non-limiting examples of embodiments of the invention are envisioned wherein one RF signal may correspond to, for example, two, three, or four RF amplifiers, such that each amplifier amplifies the same RF signal. Any number of combinations and/or permutations of any number of RF signals and/or RF amplifiers as described are envisioned.

Each RF amplifier 26, 28 may be correspondingly configured to deliver the amplified signal to the one or more RF applicators 30, 32, which are configured to direct the amplified RF signal, shown as an e-field 34, into the cavity 14. The generator power supply 36 may be additionally configured to operatively convert power received to an alternative power output. For example, the generator power supply 36 may be configured to convert an AC power input to a high current, low voltage DC output. Alternative power conversions are envisioned, and the example provided is merely one non-limiting example of a power conversion. Additionally, the controller 40 may be any appropriate device that is capable of receiving input signals, generating, processing, and/or determining commands, and providing the commands and/or command signals based on said commands, as one or more outputs. For example, the controller 40 may include one or more programmable logic devices, application specific integrated circuits, digital signal processors, and/or microcontrollers.

During operation of the oven 10, food items to be cooked are placed into the cavity 14 via the open door 16, and then the door 16 is closed. The controller 40 operates to control the oven 10 such that the power supply 38 provides a power input to the generator power supply 36, which is controlled to convert the power input from the power supply 38 to a sufficient power output delivered to the RF generator 24. One example of the generator power supply 36 may include, for instance, converting a mains power input of alternating current (AC) to a low voltage direct current (DC) output. The RF generator 24 may generate a radio frequency electromagnetic radiation (e-field) signal, which may be significantly or trivially amplified by each respective first and second RF amplifier 26, 28, and delivered from each RF amplifier 26, 28 to the respective first and second RF applicators 30, 32 for application of the electromagnetic radiation to the cavity 14.

Figure 2:
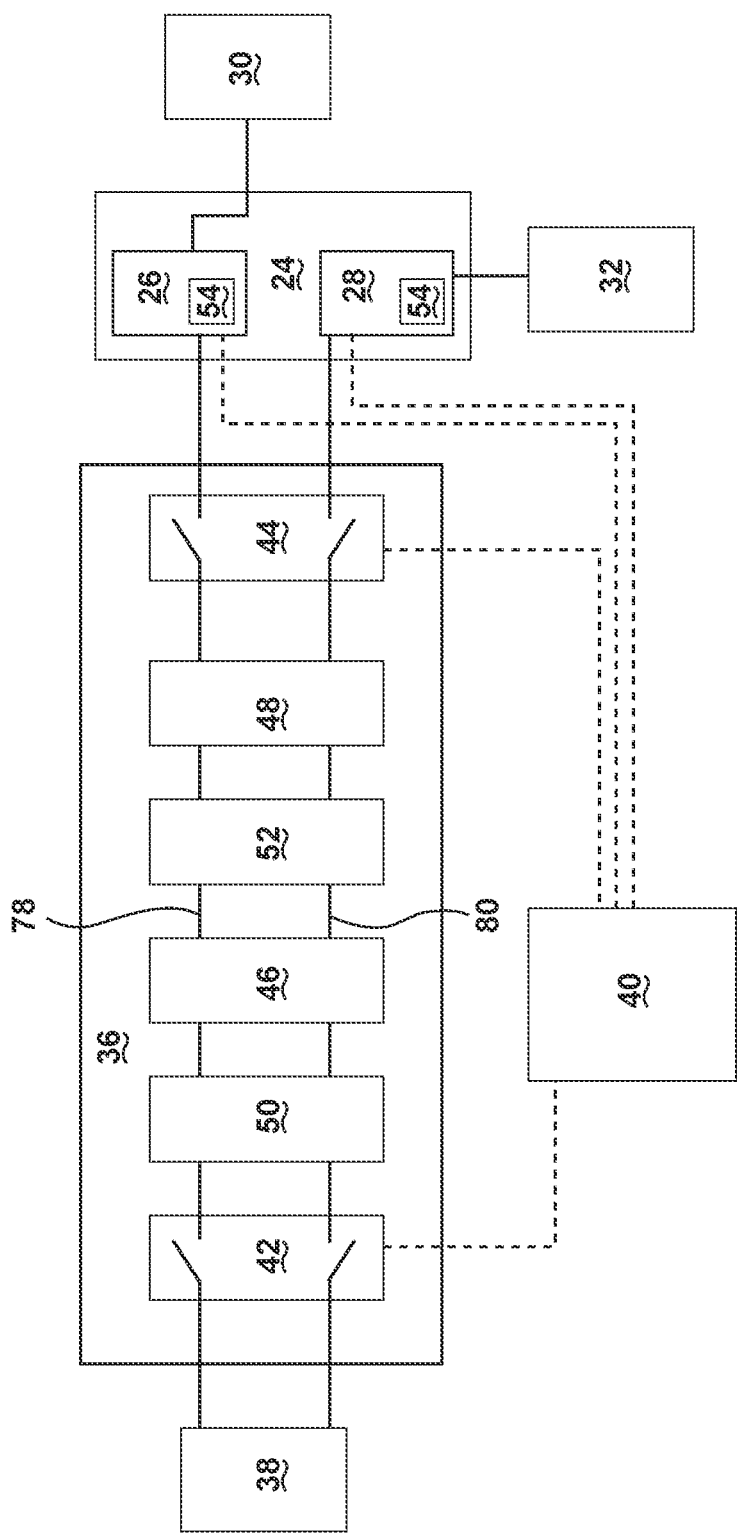
FIG. 2 is a schematic view of the power source, generator power supply, RF generator, and RF applicators of FIG. 1, in accordance with one embodiment of the invention.

FIG. 2 schematically illustrates the generator power supply 36 and RF generator 24 in further detail. The generator power supply 36 further comprises at least one interrupting circuit having electrical decoupling capabilities, shown as a first interrupting circuit 42 and a second interrupting circuit 44, at least one energy reserve, shown as a first energy reserve 46 and a second energy reserve 48, and at least one power conversion circuit, for example, an AC to DC converter 50 and/or a DC to DC converter 52. Additionally, each RF amplifier 26, 28 may further comprise a temperature circuit 54.

As shown, the power source 38 is electrically coupled with the first interrupting circuit 42, which is further coupled with the AC to DC converter 50. The first energy reserve 46 is electrically coupled to both the AC to DC converter 50 and the DC to DC converter 52. The second energy reserve 48 electrically couples the DC to DC converter 52 to the second interrupting circuit 44, which is further coupled with the RF generator 24. The controller 40 is communicatively coupled via communication lines (illustrated as dotted lines) to each of the first and second interrupting circuits 42, 44 and each temperature circuit 54.

Each of the aforementioned couplings between the power source 38, generator power supply 36 components 42, 44, 46, 50, 52, and RF generator 24 are shown having two electrical connections, for instance, a voltage line 78 and a ground line 80, but alternative electrical connections are envisioned. Each of the first and second interrupting circuits 42, 44 is positioned on at least one of the voltage line 78 or the ground line 80, or the interrupting circuit 42, 44 is positioned on both the voltage line 78 and the ground line 80.

Each interrupting circuit 42, 44 may be configured to electrically couple the connected components while in a first, closed state, and may be configured to electrically decouple the connected components while in a second, open state. Each interrupting circuit 42, 44 may be further configured to monitor the electrical couplings and detect a fault between respective components, such as irregular or erroneous power characteristics, for example, current and/or voltage characteristics. In this respect, each of the first and second interrupting circuits 42, 44 may be considered to include the controller 40, which participates in monitoring and detecting a fault in the oven 10 as well as controlling the coupling or decoupling functions of the first and second interrupting circuits 42, 44. Additionally, each energy reserve 46, 48 is capable of regulating the generator power supply 36 power during operation and supplying an amount of power even during a fault event, such as a break in operation, at each respective coupling location. In one example, the energy reserve 46, 48 may comprise a capacitor or an energy buffer, which may provide power to the respective components for more than 300 milliseconds (ms) after a fault such as a break in the circuit.

Additionally, while a temperature circuit 54 is described, it is envisioned that the temperature circuit 54 may comprise a temperature sensor, or another non-temperature sensor circuit, for determining the actual or estimated temperature of each respective RF amplifier 26, 28 without a temperature sensor. For example, a temperature circuit 54 is envisioned wherein the temperature circuit 54 may be initially calibrated to the respective RF amplifier 26, 28 using, for example, a negative temperature coefficient (NTC) thermistor or sensor, to generate and/or provide a thermal model for the temperature circuit 54. In this example, the thermal model may be calibrated once by measuring the temperature of the RF amplifier 26, 28 while generating an RF feed from the RF amplifier 26, 28 using, for example, forward and reflected power while utilizing or not utilizing an actual temperature sensor. In other words, the thermal model is calibrated to the RF amplifier 26, 28. Additionally, the above-described calibration and/or thermal model may be based on a lumped elements model or a distributed elements model. It is further contemplated that the temperature circuit 54 may be disposed in the RF generator 24 for determining the actual or estimated temperature of the RF generator 24 as a whole.

During RF generator 24 operation, the power source 38 may provide, for example, AC power to the generator power supply 36. The AC power arrives through the first interrupting circuit 42 in a closed state, and may be delivered to the AC to DC converter 50, where the AC power input is converted to a DC power output. The DC power output is supplied to the first energy reserve 46 and further delivered to the DC to DC converter 52, which converts the DC power output of the AC to DC converter 50 to a low voltage DC output. The low voltage DC output may be supplied to the second energy reserve 48, which may be further supplied through the second interrupting circuit 44, in a closed state, to the RF generator 24.

The controller 40 controls the generator power supply 36, the RF generator 24, and each interrupting circuit 42, 44 such that the oven 10 applies a desired e-field 34 to the cavity 14. However, in the event of a fault in the oven 10, the controller 40 may operate one, both, or any permutation of a number of interrupting circuits 42, 44 to change the respective interrupting circuits 42, 44 to an open state, which decouples the generator power supply 36 from the power source 38 or source of mains power. One example of a fault that may trigger the use of one or more interrupting circuits 42, 44 by the controller 40 may be when one or more door switches 20, 22 indicate the door 16 is moved to the open condition. Another example of a fault that may trigger the use of one or more interrupting circuits 42, 44 by the controller 40 may be one or more interrupting circuits 42, 44 monitoring and detecting an irregular or erroneous power characteristic between the aforementioned components, or between the power source 38, or the source of mains power, and the generator power supply 36, e.g., a break in the mains power or power source 38 to the generator power supply 36.

Yet another example of a fault that may trigger the use of one or more interrupting circuits 42, 44 by the controller 40 may be based on a determination by one or more temperature circuits 54 that an irregular and/or erroneous temperature condition exists based on a temperature reading, sensing, estimation, or comparison. In this example, an RF feed may be generated from the RF amplifier 26, 28. The temperature circuit 54 may measure the gain of the respective RF amplifier 26, 28 while generating the RF feed, and may then compare the measured gain, which may be over time, to a thermal model of the temperature circuit 54. The temperature circuit 54 may then estimate the temperature of the respective RF amplifier 26, 28 based on the comparison of the measured gain to the thermal model. Non-limiting examples of the RF feed may include the power provided to the RF amplifier 26, 28, the amount of energy amplified or consumed during operation of the RF generator 24 and/or the RF amplifier 26, 28.

In this example, utilizing the temperature circuit 54, the method described may be further characterized by creating a prediction model based on the comparison, and may, for example, generate a fault indication or estimate the temperature of the RF amplifier 26, 28, based on the prediction model. Furthermore, the method described may be utilized to estimate the temperature of any power transmission system, a dummy load, or a circulator in the RF amplifier 26, 28. As well, any of the foregoing methods may be applied to estimating the temperature of the RF generator 24.

In yet another example, a fault may be based on the power reflections in at least one of the cavity 14, either one or both RF amplifiers 26, 28, and/or either one or both RF applicators 30, 32. It is known that e-field 34 reflections occur due to load mismatch. In order to avoid high levels of e-field 34 reflections, embodiments of the invention are envisioned wherein one or more of the cavity 14 or aforementioned components 26, 28, 30, 32 may be capable of, or may contain an e-field 34 sensing device capable of determining a reflected power, and provide the e-field 34 sensing information to the controller 40, such that the controller 40 may make a determination of a fault based on the reflected e-field 34. For instance, in one embodiment of the invention, the controller 40 may take into account all reflected e-fields 34 from each RF amplifier 26, 28, or each RF channel, in making a determination. In another instance, the controller 40 may also take into account, or filter out, reflected e-field 34 levels that are within a normal or expected operating ranges.

Figure 3:
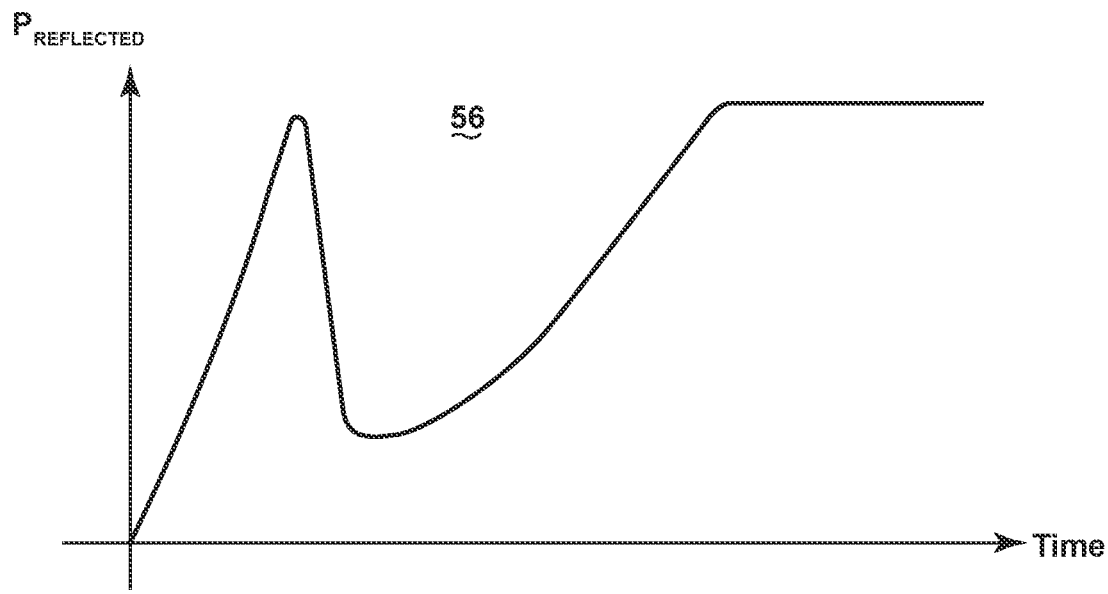
FIG. 3 is a graphic representation of a reflective e-field power as a function of time in accordance with one embodiment of the invention.
Figure 4:
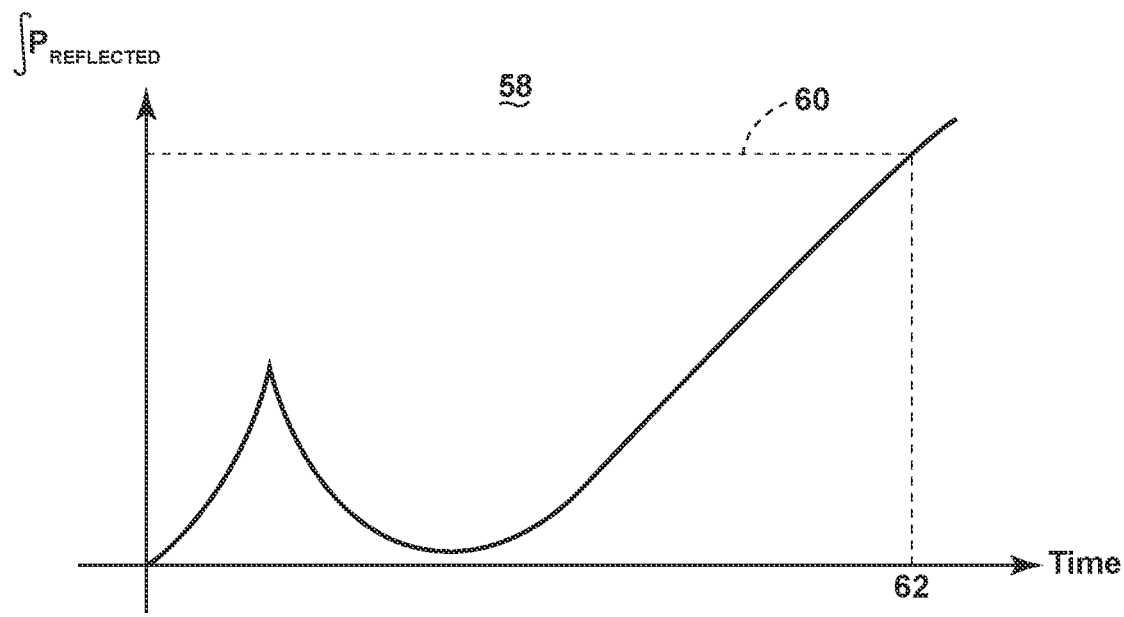
FIG. 4 is a graphical representation of the integral of the reflected e-field power of FIG. 3 as a function of time in accordance with one embodiment of the invention.

For example, FIG. 3 illustrates an exemplary first graph 56 demonstrating, for instance, a measured amount of e-field 34 reflection in the cavity 14 as a function of time. FIG. 4 illustrates a corresponding second graph 58 that shows the integral of the first graph 56 as a function of time. In the second graph 58, the dotted line represents a predetermined amount of integrated reflected e-field 60 that must be accumulated before the controller 40 determines a fault occurs. As shown in the second graph 58, the controller 40 would determine that a fault occurs at a time 62. Alternatively, embodiments of the invention are envisioned wherein the integral of the reflected e-field 34 is based on a moving predetermined time window, such that only the amount of reflected e-field 34 in, for example, the most recent one second, is summed. Thus, in this alternative example, a fault would only occur if the integrated e-field 34 reflected is greater than a predetermined amount of reflected e-field 60 for any given, consecutive, one-second period. Alternative summation techniques, as well as alternative time periods, are envisioned.

During operation, if a fault is detected, regardless of which of the above-described methods determines the fault, the controller 40 may operate one or more interrupting circuits 42, 44. If the controller 40 operates the second interrupting circuit 44 to interrupt the low voltage DC power to the microwave RF generator 24, any residual power in the first or second energy reserves 46, 48 is barred from reaching the RF generator 24 so that power can be cut off faster than if the first interrupting circuit 42 were the only interrupting circuit 42, 44 operated. Preferably the second interrupting circuit 44 is configured to monitor for and detect a fault and, if a fault is detected, to interrupt the low voltage DC to the RF generator 24 within a predetermined time, which may be less than the time necessary to dissipate the energy stored in one or more energy reserves 46, 48. In one non-limiting example, the predetermined time may be 20 ms, or within 20 ms of the fault detection.

Alternatively, during operation, if a fault is detected, regardless of which of the above-described methods determines the fault, the controller 40 may operate the generator power supply 36, the RF generator 24, and/or any number of the RF amplifiers 26, 28 to derate the e-field generation. For example, one embodiment of the invention is envisioned wherein the controller 40 may determine the temperature of one or more of the RF amplifiers 26, 28 (as described above), and also estimate or determine the amount of reflected e-field 34 power between the at least two RF amplifiers 26, 28, (i.e. a "crosstalk" power level). Based on the temperature determination and/or the crosstalk estimation, the controller 40 may reduce the transmitted e-field 34 power level for at least one of the RF amplifiers 26, 28 in at least a two-step process.

Figure 5:
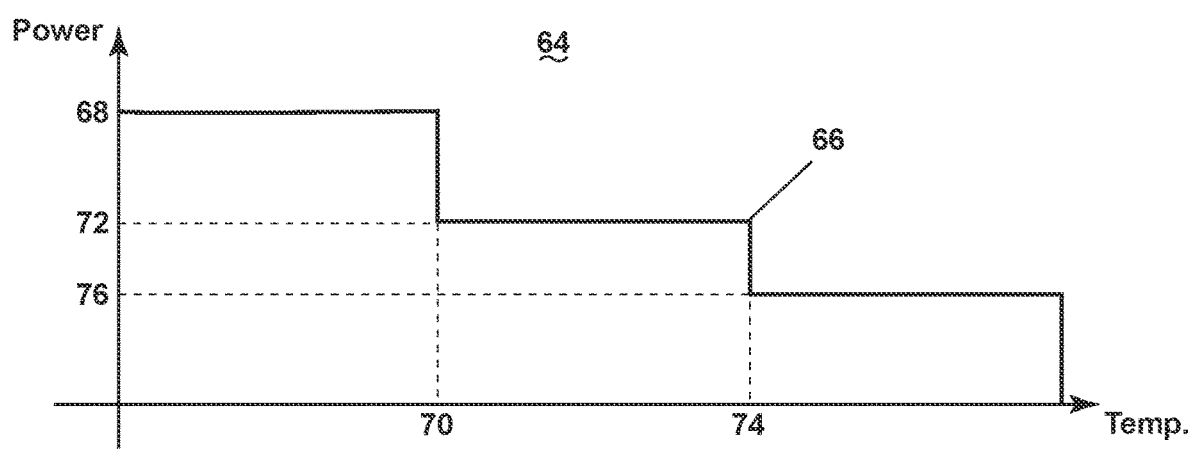
FIG. 5 is graphical representation of a step-down process for controlling applied power in accordance with one embodiment of the invention.

FIG. 5 illustrates a third graph 64 of an exemplary two-step process, as described. As shown, the amount of power applied by one or more RF applicators 30, 32 may change as a function of temperature. For example, the applied power 66 may be a maximum power level 68 of applicable power until it is determined that the temperature of at least one of the RF amplifiers 26, 28 is above a first predetermined temperature threshold, shown as a first threshold temperature 70. Similarly, the applied power 66 may be a maximum power level 68 of applicable power until a crosstalk power level is estimated between two or more of the RF amplifiers 26, 28, where the crosstalk power level is above a second predetermined threshold, as described above. When either or both of these conditions are met, a fault or error may be detected. Upon detecting such a fault or error, the applied e-field 34 power may be reduced to a first power level 72, which is less than the maximum power level 68.

In instances where even the first power level 72 continues to increase the temperature of one or more RF amplifiers 26, 28 or the crosstalk power level of two or more of the RF amplifiers 26, 28, the power levels may be further reduced. For example, if it is determined that the temperature of at least one of the RF applicators 30, 32 reaches a second threshold temperature 74, and/or if it is estimated that the crosstalk power levels reach another predetermined threshold, the power level may further be reduced as shown to an even lower second power level 76. Any number of power levels may continue to reduce the amount of applied power 66 until, for example, the temperature stabilizes or reduces below a predetermined level, or the estimated crosstalk power level stabilizes or reduces below a predetermined level or the RF amplifiers 26, 28 are powered off entirely after reducing the power level to zero.

It is envisioned that where a plurality of RF amplifiers 26, 28 generate multiple RF e-fields 34, or feeds at different frequencies, the transmitted power level may be reduced only for those RF amplifiers 26, 28 where the temperatures exceed the first predetermined threshold or where the crosstalk power levels exceed the second predetermined threshold. Stated another way, embodiments are envisioned where each RF amplifier 26, 28 is independently operated based on the temperature or e-field 34 reflections measured by the respective RF amplifier 26, 28. Alternatively, embodiments of the invention are envisioned wherein the transmitted power level is reduced for all RF amplifiers 26, 28 when any temperatures exceed the first predetermined threshold or when any crosstalk power levels exceed the second predetermined threshold. In another alternative embodiment, the transmitted power level is reduced for all RF amplifiers 26, 28 when any temperatures exceed the first predetermined threshold and when any crosstalk power levels exceed the second predetermined threshold.

Many other possible embodiments and configurations in addition to that shown in the above figures are contemplated by the present disclosure. For example, one embodiment of the invention contemplates redundant components, such as a second controller or multiple temperature circuits to provide increased reliability or comparisons of functionality. Another embodiment of the invention contemplates directly coupling one or more door sensors 20, 22 directly to one or more interrupting circuits 42, 44 such that when the door is moved to an open state, the interrupting circuits 42, 44 interrupt the power from the power source 38 to the RF generator 24 immediately without controller 40 operation. Additionally, the design and placement of the various components may be rearranged such that a number of different in-line configurations could be realized.

The embodiments disclosed herein provide a method for operating a radio frequency generator. One advantage that may be realized in the above embodiments is that the above-described embodiments have superior failure prevention capabilities. With the proposed fault determinations and detections and the power stepping and/or power interruption, as described above, any RF application can be accomplished with reduced risk of overheating, e-field leakage, and/or severe e-field interference (i.e. reflections, crosstalk) compared to conventional RF applications. The reduced risk of overheating also reduces risk of component scorching or burning, and reduces the fire risk for the RF application. Yet another advantage of the above-described embodiments is that the interrupting circuits provide a reliably fast way to interrupt the RF generation prior to the dissipation of the energy within the energy reserves of the generator power supply. Thus, the RF generation may be abruptly stopped prior to energy dissipation generating additional e-fields, which may be irregular, or increase fault-causing conditions, such as increase the excess temperature of the cavity.

Yet another advantage of the above-described embodiments includes the capability to provide an estimate of RF applicator temperature without the need of providing a direct temperature sensor. This may result in reduced component expenses, which has a direct competitive advantage. Finally, by providing an RF application the capabilities to prevent over-temperature conditions, the reliability of the entire RF system, including the components, is increased due to reduced thermal stresses. The above-described conditions further reduce the mean time between failures (MTBF) and reduce the likelihood of system failure due to excessive temperature.

It is contemplated that the present disclosure encompasses at least the following inventive concepts:

Interrupting Circuit for RF Generator

1. A device (10) for generating a field of electromagnetic radiation (e-field) (34) from a radio frequency (RF) generator (24) configured to convert low voltage direct current (DC) into the e-field (34) for application to an article in the e-field (34), comprising a generator power supply (36) connected between a power source (38) and the RF generator (24), the generator power supply (36) having at least one energy reserve (46, 48) and at least one power conversion circuit (50, 52) to convert power to low voltage DC for the RF generator (24), characterized by:

at least one interrupting circuit (44) configured to monitor for and detect a fault in the device (10), and if a fault is detected, to interrupt the low voltage DC between the at least one energy reserve (46, 48) and the RF generator (24) within a predetermined time less than the time to dissipate energy stored in the at least one energy reserve (46, 48).

2. The device (10) of 1, wherein the device is one of an RF oven or an RF dryer.

3. The device (10) of 1, wherein the device is an oven having a cabinet (12) defining a cavity (14) for electromagnetically heating a foodstuff in the cavity; a door (16) moveably mounted to the cabinet for movement between opened and closed conditions to selectively provide access to the cavity; and at least one door interlock switch (20, 22) that causes a fault when the door is moved to the open condition.

4. The device (10) of any one of 1-3, wherein the power supply (38) is connected to the RF generator (24) by a voltage line (78) and a ground line (80), and the at least one interrupting circuit (44) is in one of the voltage line (78) or the ground line (80).

5. The device (10) of 2, comprising an interrupting circuit (44) in each of the voltage line (78) and the ground line (80).

6. The device (10) of any one of 1-5, wherein the predetermined time is 20 ms.

Method of Derating Power Amplifiers in a Microwave Oven

1. A method of derating at least one radio frequency (RF) amplifier in a device configured to generate RF feeds, the method characterized by:
    determining the temperature of the at least one RF amplifier; and
    reducing the transmitted power level for the at least one RF amplifier in at least two steps when the temperature of at least one RF amplifier is above a first predetermined threshold.

2. The method of 1, including estimating a crosstalk power level between at least two RF amplifiers; and
    reducing the transmitted power level for the at least two RF amplifiers in at least two steps when the crosstalk power level is above a second predetermined threshold.

3. The method of 1 or 2, wherein a plurality of RF amplifiers generates multiple RF feeds at different frequencies, and the transmitted power level is reduced only for those RF amplifiers where the temperatures exceed the first predetermined threshold or where the crosstalk power levels exceed the second predetermined threshold.

4. The method of 3, wherein the transmitted power level is reduced for all RF amplifiers when any temperatures exceed the first predetermined threshold or when any crosstalk power levels exceed the second predetermined threshold.

5. The method of 3, wherein the transmitted power level is reduced for all RF amplifiers when any temperatures exceed the first predetermined threshold and when any crosstalk power levels exceed the second predetermined threshold.

Method of Determining Temperature of Solid State Amplifier

1. A method of determining the temperature of a radio frequency (RF) amplifier without a temperature sensor in a device configured to generate RF feeds, the method characterized by:
    providing a thermal model calibrated to the RF amplifier;
    generating an RF feed from the RF amplifier;
    measuring gain of the RF amplifier while generating the RF feed;
    comparing the measured gain over time to the thermal model; and
    estimating the temperature of the RF amplifier based on the comparison.

2. The method of 1, further characterized by creating a prediction model based on the comparison.

3. The method of 1, wherein the thermal model is calibrated once by measuring the temperature of the RF amplifier while generating an RF feed from the RF amplifier using forward and reflected power, with or without a temperature sensor.

4. The method of any one of 1-3, wherein the temperature of a power transmission system or a dummy load or a circulator in the RF amplifier is estimated.

5. The method of any one of 1-4, wherein the thermal model is a lumped elements model or a distributed elements model.

To the extent not already described, the different features and structures of the various embodiments may be used in combination with each other as desired. That one feature may not be illustrated in all of the embodiments is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of derating at least two radio frequency (RF) amplifiers in a device configured to generate RF feeds, the method comprising the steps of:
    determining the temperature of the at least two RF amplifiers;
    reducing the transmitted power level for the at least one of the at least two RF amplifiers by a first amount when the temperature of the at least one of the two RF amplifiers is above a first predetermined temperature threshold;
    further reducing the transmitted power level for the at least one of the at least two RF amplifiers by a second amount when the temperature of the at least one of the two RF amplifiers is above a second predetermined temperature threshold;
    estimating a crosstalk power level between the at least two RF amplifiers; and
    reducing the transmitted power level for at least one of the at least two RF amplifiers by a third amount when the crosstalk power level is above a first predetermined crosstalk threshold; and
    further reducing the transmitted power level for at least one of the at least two RF amplifiers by a fourth amount when the crosstalk power level is above a second predetermined crosstalk threshold.

2. The method of claim 1, wherein the at least two RF amplifiers generate the RF feeds at different frequencies, and the transmitted power level is reduced only for those RF amplifiers where the temperatures exceed the first predetermined temperature threshold or where the crosstalk power levels exceed the first predetermined crosstalk threshold.

3. The method of claim 2, wherein the transmitted power level is reduced for all of the at least two RF amplifiers when any temperatures exceed the first predetermined temperature threshold or when any crosstalk power levels exceed the first predetermined crosstalk threshold.

4. The method of claim 2, wherein the transmitted power level is reduced for all of the at least two RF amplifiers when any temperatures exceed the first predetermined temperature threshold and when any crosstalk power levels exceed the first predetermined crosstalk threshold.

5. The method of claim 1, wherein the step of determining the temperature of the at least two RF amplifiers includes:
   providing a thermal model calibrated to the at least two RF amplifiers;
   generating the RF feeds from the at least two RF amplifiers;
   measuring gain of the at least two RF amplifiers while generating the RF feeds;
   comparing the measured gain over time to the thermal model; and
   estimating the temperature of the at least two RF amplifiers based on the comparison.

6. A method of derating at least one radio frequency (RF) amplifier in a device configured to generate an RF feed, the method comprising the steps of:
   determining the temperature of the at least one RF amplifier without a temperature sensor; and
   reducing the transmitted power level for the at least one RF amplifier in at least two steps when the temperature of the at least one RF amplifier is above a first predetermined temperature threshold,
   wherein the step of determining the temperature of the at least one RF amplifier without the temperature sensor includes:
      providing a thermal model calibrated to the RF amplifier;
      generating the RF feed from the RF amplifier;
      measuring gain of the RF amplifier while generating the RF feed;
      comparing the measured gain over time to the thermal model; and
      estimating the temperature of the RF amplifier based on the comparison.

7. The method of claim 6, further comprising the step of creating a prediction model based on the comparison.

8. The method of claim 6, wherein the thermal model is calibrated once by measuring the temperature of the RF amplifier while generating the RF feed from the RF amplifier using forward and reflected power.

9. The method of claim 6, wherein the temperature of a power transmission system or a dummy load or a circulator in the RF amplifier is estimated.

10. The method of claim 6, wherein the thermal model is a lumped elements model or a distributed elements model.

11. The method of claim 6, wherein the thermal model is calibrated once by measuring the temperature of the RF amplifier while generating the RF feed from the RF amplifier using forward and reflected power, with the temperature sensor.

12. The method of claim 6, wherein the thermal model is calibrated once by measuring the temperature of the RF amplifier while generating the RF feed from the RF amplifier using forward and reflected power, without the temperature sensor.

* * * * *